United States Patent
Fukasawa et al.

(10) Patent No.: US 8,893,582 B2
(45) Date of Patent: Nov. 25, 2014

(54) BEARING LOCKING MECHANISM

(71) Applicant: Honda Motor Co., Ltd, Tokyo (JP)

(72) Inventors: Shin Fukasawa, Saitama (JP); Hisayuki Asada, Saitama (JP); Yoshiatsu Asai, Saitama (JP); Mitsuhiro Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/764,237

(22) Filed: Feb. 11, 2013

(65) Prior Publication Data

US 2013/0220072 A1    Aug. 29, 2013

(30) Foreign Application Priority Data

Feb. 24, 2012 (JP) ................. 2012-038542

(51) Int. Cl.
| | | |
|---|---|---|
| *F16H 57/04* | (2010.01) | |
| *F16C 35/067* | (2006.01) | |
| *F16H 57/021* | (2012.01) | |
| *F16C 33/66* | (2006.01) | |
| *F16C 19/54* | (2006.01) | |
| *F16H 57/023* | (2012.01) | |
| *F16H 57/02* | (2012.01) | |

(52) U.S. Cl.
CPC ............ *F16C 35/067* (2013.01); *F16H 57/021* (2013.01); *F16C 2361/65* (2013.01); *F16C 33/6677* (2013.01); *F16C 19/54* (2013.01); *F16H 57/023* (2013.01); *F16H 2057/02047* (2013.01)

USPC ........................................................ 74/606 R

(58) Field of Classification Search
USPC ..................... 74/606 R; 184/6.12, 11.1, 13.1
See application file for complete search history.

(56) References Cited

U.S. PATENT DOCUMENTS

| | | | | |
|---|---|---|---|---|
| 3,195,682 | A | * | 7/1965 | Reneerkens ................. 184/11.1 |
| 3,469,897 | A | * | 9/1969 | Rike .............................. 384/542 |
| 3,692,372 | A | * | 9/1972 | Pineo ............................ 384/557 |
| 4,784,018 | A | * | 11/1988 | Okada et al. ................. 475/146 |
| 5,154,517 | A | * | 10/1992 | Hodge .......................... 384/470 |
| 5,788,210 | A | * | 8/1998 | Mimura ........................ 248/672 |
| 6,106,155 | A | * | 8/2000 | Beyfuss et al. ............... 384/537 |
| 6,408,519 | B1 | * | 6/2002 | Beyfuss et al. ............ 29/898.07 |

FOREIGN PATENT DOCUMENTS

JP    2003-97579 A    4/2003

* cited by examiner

*Primary Examiner* — Vicky Johnson
(74) *Attorney, Agent, or Firm* — Westerman, Hattori, Daniels & Adrian, LLP

(57) ABSTRACT

A bearing locking mechanism capable of surely preventing dropping of a bearing, without increasing size of a transmission, is provided. In a bearing locking mechanism in which a bearing G3c of a rotating body G3b axially supported by a transmission case 7 rotationally is prevented from dropping from the transmission case 7, a transmission 1 is equipped with a brake B1 provided so as to be adjacent to the bearing G3c, the brake B1 is equipped with a fixing member B1a to be fixed to the transmission case 7, and the bearing G3c is prevented from dropping from the transmission case 7 by the fixing member B1a engaging with a side surface in an axial direction of the bearing G3c.

2 Claims, 3 Drawing Sheets

BEARING LOCKING MECHANISM

BACKGROUND OF THE INVENTION

1. Field of the Invention

The present invention relates to a structure which prevents a bearing of a rotating body pivotally supported on a transmission case rotationally from moving in a direction of a central axis of rotation.

2. Description of the Related Art

Conventionally, as a structure which prevents a bearing of a rotating body pivotally supported on a transmission case rotationally from moving in a direction of a central axis of rotation, a one using a circlip is known (for example, refer to Japanese Patent Laid-Open No. 2003-97579). In this structure, an annular groove to which the circlip is fitted is provided on an outer ring of the bearing, and an annular groove to which the circlip is fitted is also provided on the transmission case, so as to correspond to the annular groove of the outer ring.

When fixing the bearing by the circlip, a notch portion must be provided to the transmission case so that it becomes possible to push the circlip open and insert the bearing therein or remove the same therefrom. In order to prevent the durability of the transmission case from decreasing by providing such notch portion, the transmission case must be made from a comparatively thick member, so that a bearing locking mechanism becomes large in size.

SUMMARY OF THE INVENTION

In view of the limitation now present in the prior art, an object of the present invention is to provide a bearing locking mechanism capable of surely preventing a bearing from dropping, without increasing the size of a transmission.

[1] In order to achieve the object mentioned above, the present invention is a bearing locking mechanism which prevents a bearing of a rotating body pivotally supported on a transmission case rotationally from dropping from the transmission case, wherein a transmission includes a brake which is provided so as to be adjacent to the bearing, the brake includes a fixing member which is fixed to the transmission case, and the bearing is prevented from dropping from the transmission case, by the fixing member being engaged with a side surface in an axial direction of the bearing.

With such structure, the fixing member is locked to the side surface on the axial direction of the bearing, so that it becomes possible to prevent the bearing from dropping from the transmission case. As such, there is no need for a circlip, and there is no need to form a notch portion for mounting the circlip to the case. Therefore, it becomes possible to prevent the size increase of the transmission and to surely prevent the dropping of the bearing, without decreasing the durability of the transmission case.

[2] In the present invention, the fixing member may be equipped with an overhanging portion which overhangs outwardly in a radial direction, and the overhanging portion may receive force in the axial direction which is transmitted from a bearing of other rotating body to the transmission case. By doing so, it becomes possible to improve the strength of the fixing member and the transmission case using the space outwardly in the radius direction of the fixing member.

[3, 4] In the present invention, it is preferable that the rotating body is formed with a lubricating oil hole, and a lubricating oil is supplied to an outer peripheral surface of the rotating body from the lubricating oil hole, and the fixing member is formed with a guide portion which guides the lubricating oil supplied to the outer peripheral surface of the rotating body to the bearing. By doing so, it becomes possible to appropriately supply the lubricating oil to the bearing.

DESCRIPTION OF THE PREFERRED EMBODIMENTS

Figure 1:
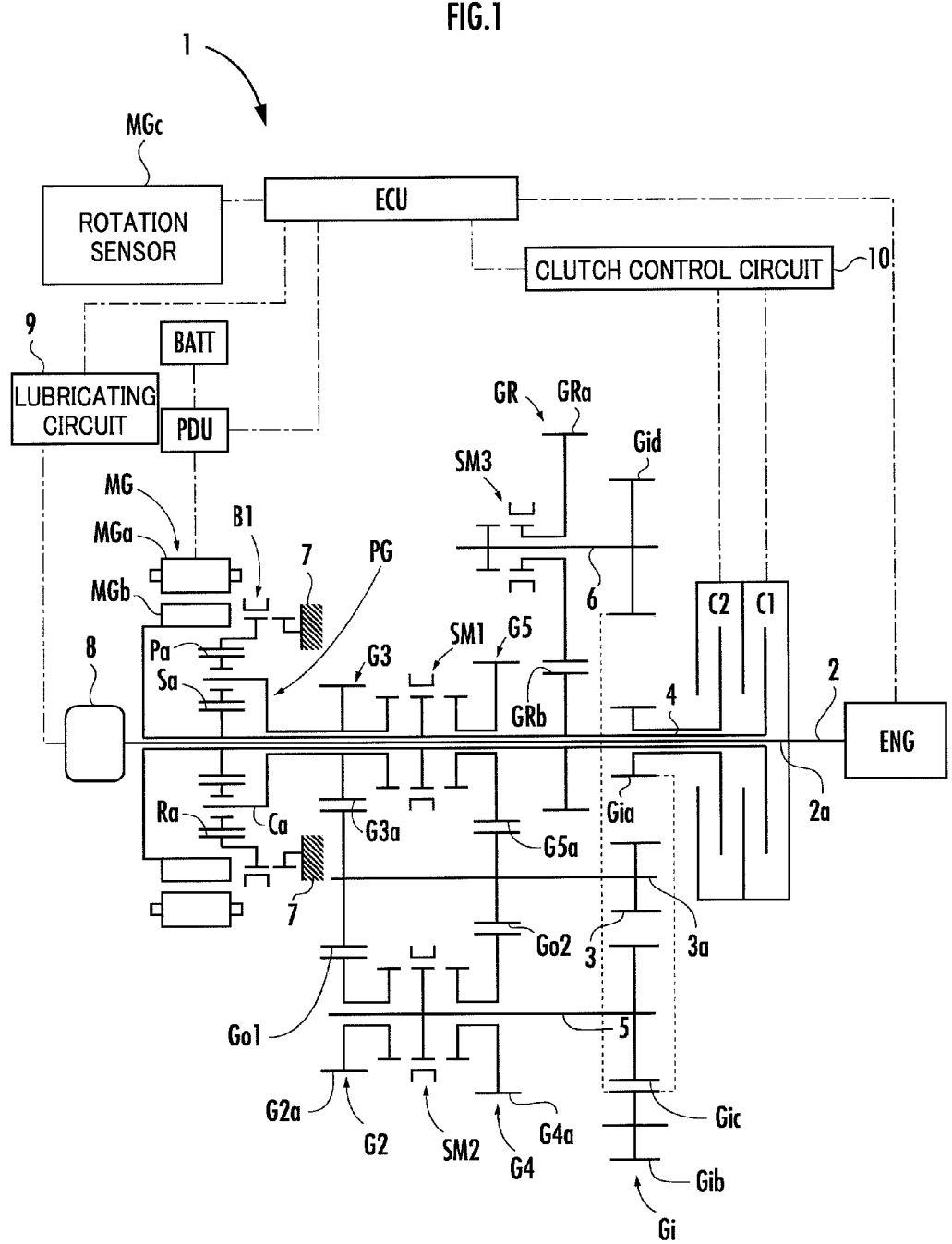
FIG. 1 is a skeleton view of an embodiment of a transmission to which a bearing locking mechanism of the present invention is applied.

Explanation will be given on an embodiment of a transmission applied with a bearing locking mechanism of the present invention, with reference to the accompanying drawings. FIG. 1 shows an automatic transmission 1 of the present embodiment. The automatic transmission 1 is equipped with an input shaft 2 which is transmitted with a driving force (output torque) of an internal combustion engine ENG configured from an engine, an output member 3 configured from an output gear which outputs the power to left and right front wheels as drive wheels, via a differential gear not shown, and a plurality of gear trains G2 through G5 having different transmission ratios.

Further, the automatic transmission 1 is equipped with a first drive gear shaft 4 which pivotally supports drive gears G3a, G5a rotationally of respective odd-numbered gear trains G3, G5 for establishing odd-numbered speeds in the gear ratio order, a second drive gear shaft 5 which pivotally supports drive gears G2a, G4a rotationally of respective even-numbered gear trains G2, G4 for establishing even-numbered speeds in the gear ratio order, and a reverse shaft 6 which pivotally supports a reverse drive gear GRa rotationally of a reverse gear train GR, which is used for establishing a reverse speed, and which is configured from the reverse drive gear GRa and a reverse driven gear GRb. The first drive gear shaft 4 is disposed at the same axis line as the input shaft 2, and the second drive gear shaft 5 is disposed in parallel to the first drive gear shaft 4.

Further, the automatic transmission 1 is equipped with an idle gear train G1, which is configured from an idle drive gear Gia which is pivotally supported on the first drive gear shaft 4 rotationally, a first idle driven gear Gib which is configured to intermesh with the idle drive gear Gia, a second idle driven gear Gic which is configured to intermesh with the first idle driven gear Gib and which is fixed to the second drive gear shaft 5, and a third idle driven gear Gid which is configured to intermesh with the first idle driven gear Gib and which is fixed to the reverse shaft 6.

The automatic transmission 1 is equipped with a first clutch C1 and a second clutch C1 that are configured from a wet friction clutch of a hydraulically-actuated type. The first clutch C1 is configured so as to freely switch between a transmission state of transmitting the driving force of the internal combustion engine ENG, which is transmitted to the input shaft 2, to the first drive gear shaft 4, and a released state in which the driving force transmission is disabled. The second clutch C2 is configured so as to freely switch between a transmission state of transmitting the driving force of the internal combustion engine ENG which is transmitted to the input shaft 2, to the second drive gear shaft 5, and a released state in which the driving force transmission is disabled.

The states of both clutches C1 and C2 are switched by a hydraulic pressure supplied from a clutch control circuit 10. Further, both clutches C1 and C2 may adjust a fastening pressure in the transmission state (may realize a so-called half-clutch state), by adjusting the hydraulic pressure with an actuator (not shown) equipped by the clutch control circuit 10.

A lubricating circuit 9 is provided with a lubricating oil from a pump 8, and the lubricating circuit 9 is equipped with an oil passage which distributes the lubricating oil to portions in the automatic transmission 1 which requires lubrication, such as the clutches C1 and C2. The pump 8 is arranged coaxially to the input shaft 2, on an end on the opposite side to the internal combustion engine ENG, and is driven by the internal combustion engine ENG via a pump shaft 2a connected to the input shaft 2 through an inner side of the hollow first drive gear shaft 4.

Similar to the pump 8, the lubricating circuit 9 is arranged coaxially with the input shaft 2, on the end on the opposite side to the internal combustion engine ENG.

Further, to the automatic transmission 1, a planetary gear mechanism PG is arranged coaxially with the input shaft 2, at a position further to the internal combustion engine ENG side than the pump 8. The planetary gear mechanism PG is configured from a single-pinion type composed of a sun gear Sa, a ring gear Ra, and a carrier Ca pivotally supporting a pinion Pa intermeshed with the sun gear Sa and the ring gear Ra in such a way that the pinion can rotate and revolve freely.

If the three elements composed of the sun gear Sa, the carrier Ca and the ring gear Ra of the planetary gear mechanism PG are arranged in the order of intervals relative to gear ratios in a collinear chart (a diagram illustrating relative rotation velocities of each element by straight lines), as a first element, a second element, and a third element from the sun gear Sa side, then the first element is the sun gear Sa, the second element is the carrier Ca, and the third element is the ring gear Ra.

Further, a gear ratio of the planetary gear mechanism PG (number of teeth of the ring gear Ra/number of teeth of the sun gear Sa) is given as g, then, a ratio of a distance between the sun gear Sa which is the first rotating element and the carrier Ca which is the second rotating element with respect to a distance between the carrier Ca which is the second rotating element and the ring gear Ra which is the third rotating element is g: 1.

The sun gear Sa which is the first element is fixed on the first drive gear shaft 4. The carrier Ca which is the second element is coupled with a 3rd-speed drive gear G3a of a 3rd-speed gear train G3. The ring gear Ra which is the third element is releasably fixed to a transmission case 7 by a lock mechanism B1 (a brake).

The lock mechanism B1 (the brake) is configured by a synchromesh mechanism, and is configured so as to freely switch between a fixed state of fixing the ring gear Ra (the third element) to the transmission case 7, and a released state of releasing this fixing.

The lock mechanism B1 (the brake) is equipped with a fixing member B1a which is fixed to the transmission case 7 by a plurality of bolts 7a. The fixing member B1a is provided with a dog teeth and a cone portion. In order to pivotally support a hub G3b of the 3rd-speed drive gear G3a rotationally by the transmission case 7, the fixing member B1a is engaged with an end surface on the pump 8 side of an outer ring of a bearing G3c for the 3rd-speed gear provided to the transmission case 7. By doing so, the bearing G3c for the 3rd-speed gear is fastened by the fixing member B1a, and is prevented from dropping from the transmission case 7 to the pump 8 side. On the internal combustion engine ENG side of the bearing G3c for the 3rd-speed gear, an end surface of an inner ring of the bearing G3c for the 3rd-speed gear is locked to a side wall of the hub G3b.

Figure 2:
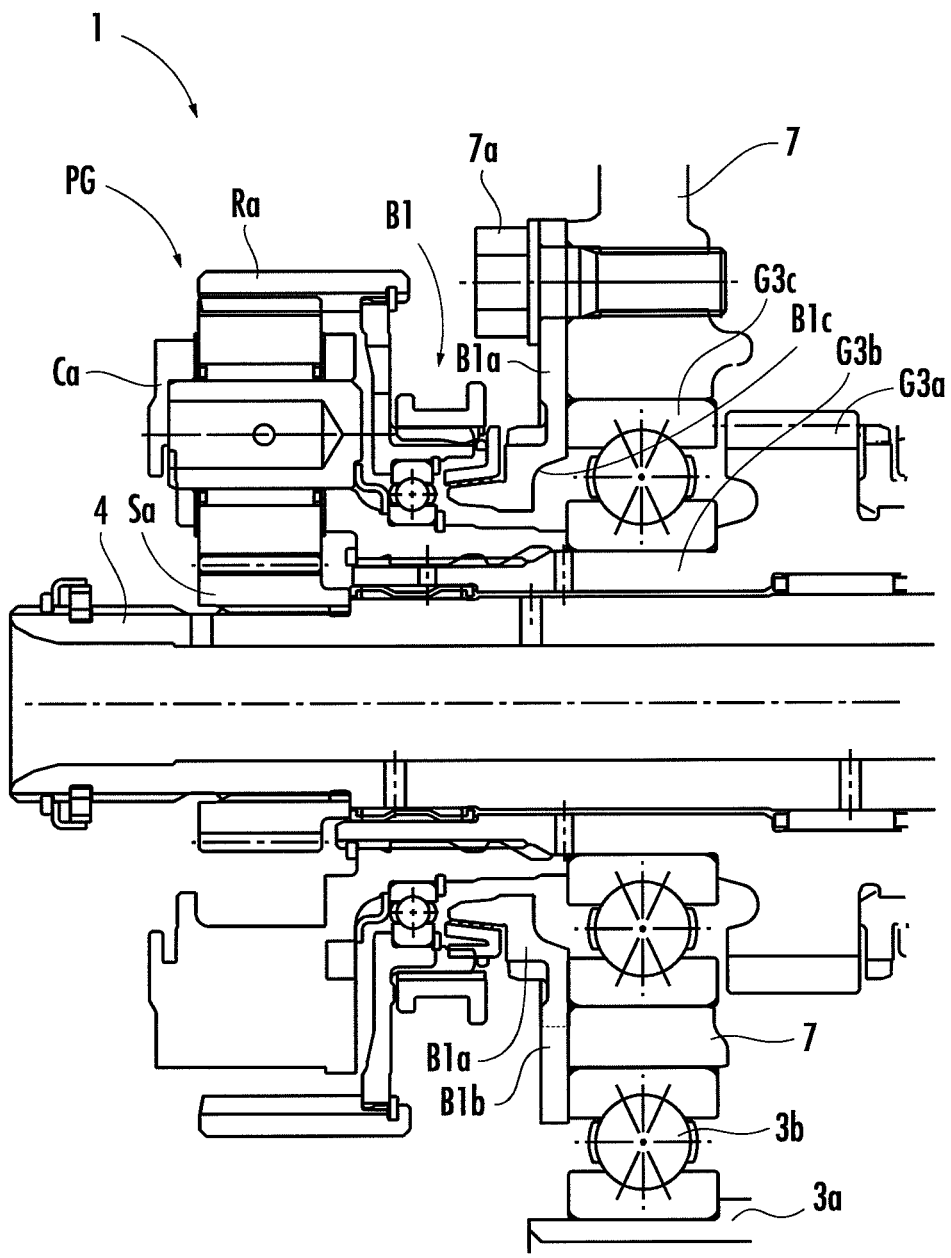
FIG. 2 is an explanatory view indicating the enlarged bearing locking mechanism portion of the present embodiment.
Figure 3A:
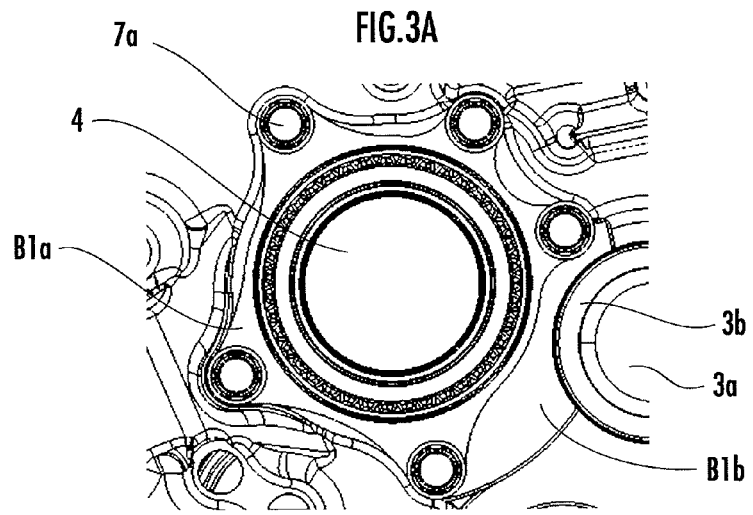
FIG. 3A is an explanatory view indicating a fixing member of the present embodiment from an axial direction.
Figure 3B:
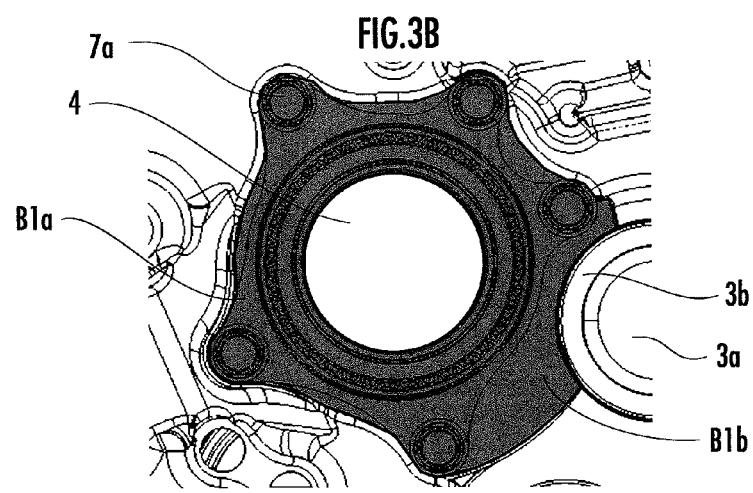
FIG. 3B is an explanatory view indicating a range of the fixing member of the present embodiment.
Figure 3C:
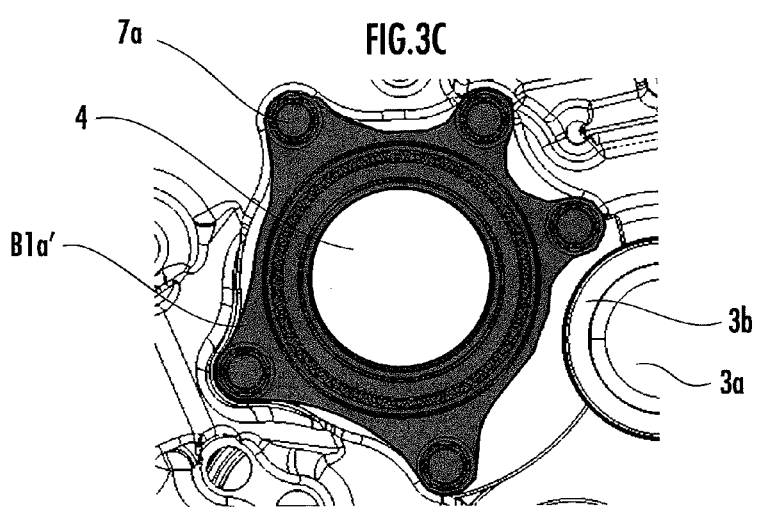
FIG. 3C is an explanatory view showing a range of the fixing member of a reference example.

As is shown in FIG. 2 and FIG. 3, the fixing member B1a is equipped with an overhanging portion B1b which overhangs outwardly in a radial direction. As is shown in FIG. 2 and FIG. 3B, the overhanging portion B1b extends to a side surface of an outer ring of a bearing 3b for an output shaft of an output shaft 3a. By doing so, the bearing 3b for the output shaft is prevented from dropping from the transmission case 7. As a reference example, FIG. 3C shows a state where the overhanging portion B1b is not provided to a fixing member B1a', and the fixing member B1a' is not extended to the portion of the transmission case 7 to which the bearing 3b for the output shaft is mounted.

The bearing 3b for the output shaft may be fixed to the transmission case 7 by a circlip. Even in this case, the force applied to the transmission case 7 from the output shaft 3a via the bearing 3b for the output shaft may be received by the overhanging portion B1b of the fixing member B1a, so that an effect of substantively increasing the rigidity of the transmission case 7 may be obtained.

Further, the planetary gear mechanism PG may be configured from a double-pinion type, in which a sun gear, a ring gear, and a carrier pivotally supporting a pair of pinions intermeshing with each other, one of the pair of pinions intermeshed with the sun gear and the other of the pair of pinions intermeshed with the ring gear, in such a way that the pair of pinions can rotate and revolve freely. In this case, for example, it may be configured that the sun gear (the first element) is fixed to the first drive gear shaft 4, the ring gear (the second element) is coupled to the 3rd-speed drive gear G3a of the 3rd-speed gear train G3, and the carrier (the third element) is releasably fixed to the transmission case 7 by the lock mechanism B1 (the brake).

An electric motor MG (a motor generator) as a rotating electrical machine which is hollow inside is disposed outside to the planetary gear mechanism PG in the radial direction. In other words, the planetary gear mechanism PG is disposed inside the hollow electric motor MG. The electric motor MG is provided with a stator MGa and a rotor MGb. The rotor MGb is equipped with a rotor hub, which is positioned between the pump 8 and the planetary gear mechanism PG, and which extends towards the input shaft 2 side. The rotor hub is splined to the first drive gear shaft 4.

Further, the electric motor MG is controlled via a power drive unit PDU (Power Drive Unit) on the basis of an instruction signal from a power control device ECU (Electronic Control Unit). The power control device ECU is configured to appropriately switch the power drive unit PDU between a driving state where the electric motor MG is driven by consuming an electric power from a secondary battery BATT, and a regenerative state where the secondary battery BATT is charged via the power drive unit PDU by the electric power generated by restricting the rotating force of the rotor MGb.

Further, the electric motor MG is provided with a rotation sensor MGc, which detects a revolution speed of the electric motor MG (a revolution speed of the rotor MGb), and the rotation sensor MGc is configured so as to freely transmit the detected revolution speed of the electric motor MG to the power control device ECU.

A reverse driven gear GRb, which intermeshes with the reverse drive gear GRa of a gear train GR for a reverse stage pivotally supported by the reverse shaft 6 rotatively, is fixed to the first drive gear shaft 4. A first driven gear Go1, which intermeshes with the 2nd-speed drive gear G2a and the 3rd-speed drive gear G3a, is fixed to the output shaft 3a axially supporting the output member 3. Further, a second driven gear G02, which intermeshes with the 4th-speed drive gear G4a and the 5th-speed drive gear G5a, is fixed to the output shaft 3a.

As above-mentioned, by configuring a single gear Go1 as a driven gear for the 2nd-speed gear train G2 and the 3rd-speed gear train G3 and a single gear G02 as a driven gear for the 4th-speed gear train G4 and the 5th-speed gear train G5, respectively, it is possible to reduce the shaft length of the automatic transmission, which makes it more convenient to mount the automatic transmission to an FF (Front-Engine Front-Wheel Drive) type vehicle.

A first intermeshing mechanism SM1, which is configured from a synchromesh mechanism, and which is freely switchable between any one of the states of a 3rd-speed side coupled state in which the 3rd-speed drive gear G3a and the first drive gear shaft 4 are coupled, a 5th-speed side coupled state in which the 5th-speed drive gear G5a and the first drive gear shaft 4 are coupled, and a neutral state in which the coupling of the 3rd-speed drive gear G3a and the 5th-speed drive gear G5a to the first drive gear shaft 4 are uncoupled, is provided to the first drive gear shaft 4.

A second intermeshing mechanism SM2, which is configured from a synchromesh mechanism, and which is freely switchable between any one of the states of a 2nd-speed side coupled state in which the 2nd-speed drive gear G2a and the second drive gear shaft 5 are coupled, a 4th-speed side coupled state in which the 4th-speed drive gear G4a and the second drive gear shaft 5 are coupled, and the neutral state in which the coupling of the 2nd-speed drive gear G2a and the 4th-speed drive gear G4a to the second drive gear shaft 5 are uncoupled, is provided to the second drive gear shaft 5.

A third intermeshing mechanism SM3, which is configured from a synchromesh mechanism, and which is freely switchable between any one of the states of a coupled state in which the reverse drive gear GRa and the reverse shaft 6 are coupled, and the neutral state in which the coupling is uncoupled, is provided to the reverse shaft 6.

Further, the power control device ECU switches the transmission state and the released state of both clutches C1 and C2, by controlling the actuator (not shown) of the clutch control circuit 10, and adjusting the hydraulic pressure.

Hereinafter, the operations of the automatic transmission 1 having the configuration mentioned in the above will be described. In the automatic transmission 1 of the first embodiment, by engaging the first clutch C1, it is possible to start the internal combustion engine ENG by using the driving force from the electric motor MG.

In a case of establishing a first gear speed by using the driving force of the internal combustion engine ENG, the ring gear Ra of the planetary gear mechanism PG is fixed to the transmission case 7 by setting the lock mechanism B1 (the brake) to a fixed state, and the first clutch C1 is engaged to enable the transmission state.

The driving force of the internal combustion engine ENG is input to the sun gear Sa of the planetary gear mechanism PG via the input shaft 2, the first clutch C1, and the first drive gear shaft 4, and is transmitted to the 3rd-speed drive gear G3a via carrier Ca with the revolution speed of the internal combustion engine ENG input to the input shaft 2 being reduced to $1/(g+1)$.

The driving force transmitted to the 3rd-speed drive gear G3a is output from the output member 3 via the first driven gear Go1 and the output shaft 3a with the revolution speed thereof being shifted to $1/i(g+1)$, and the first gear speed is established. Herein, "i" is referred to as a gear ratio of the 3rd-speed gear train G3 configured from the 3rd-speed drive gear G3a and the first driven gear Go1 (the number of teeth of the 3rd-speed drive gear G3a/the number of teeth of the first driven gear Go1).

As mentioned above, in the automatic transmission 1 of the present embodiment, it is possible to establish the first gear speed by using the planetary gear mechanism PG and the 3rd-speed gear train, therefore, there is no necessity to have a special intermeshing mechanism for establishing the first gear speed. Further, the planetary gear mechanism PG is disposed inside the hollow electric motor MG, it becomes possible to further reduce the shaft length of the automatic transmission.

In the first gear speed, if the vehicle is in a deceleration state and a charging rate SOC (State Of Charge) of the secondary battery BATT is less than a predetermined value, the power control device ECU performs a regenerative deceleration operation which generates the electric power by applying brake with the electric motor MG. Further, if the charging rate SOC of the secondary battery BATT is equal to or more than the predetermined value, it is possible for the vehicle to perform an HEV (Hybrid Electric Vehicle) traveling in which the electric motor MG is driven to assist the driving force of the internal combustion engine ENG, or an EV (Electric Vehicle) traveling in which the vehicle travels by the driving force from the electric motor MG only.

Further, when the vehicle is in the EV traveling, the deceleration of the vehicle is allowed and a vehicular velocity is equal to or greater than a predetermined velocity, by gradually engaging the first clutch C1, the internal combustion engine ENG can be started by a kinetic energy of the vehicle without using the driving force of the electric motor MG.

Further, when the power control device ECU predicts that the vehicle traveling at the first gear speed may be shifted up to the second gear speed according to vehicle information such as the vehicular velocity, a manipulated amount of an accelerator pedal and the like, the second intermeshing mechanism SM2 is set to the 2nd-speed side coupled state in which the 2nd-speed drive gear G2a and the second drive gear shaft 5 are coupled or a pre-shift state nearby the 2nd-speed side coupled state.

In a case of establishing the second gear speed by using the driving force of the internal combustion engine ENG, the second intermeshing mechanism SM2 is set to the 2nd-speed side coupled state in which the 2nd-speed drive gear G2a and the second drive gear shaft 5 are coupled, the first clutch C1 is set to the released state, and the second clutch C2 is engaged to enable the transmission state. By doing so, the driving force of the internal combustion engine ENG is output from the output member 3 via the second clutch C2, the idle gear train G1, the second drive gear shaft 5, the 2nd-speed gear train G2, and the output shaft 3a.

In the second gear speed, when the power control device ECU predicts a shift-up in gear speed, the first intermeshing mechanism SM1 is set to the 3rd-speed side coupled state in which the 3rd-speed drive gear G3a and the first drive gear shaft 4 are coupled or a pre-shift state nearby the 3rd-speed side coupled state.

On the other hand, when the power control device ECU predicts a shift-down in the gear speed, the first intermeshing mechanism SM1 is set to the neutral state in which the 3rd-speed drive gear G3a and the 5th-speed drive gear G5a are uncoupled from the first drive gear shaft 4.

By doing so, only by setting the first clutch C1 at the transmission state and the second clutch 2 at the released state, it is possible to perform the shift-up or the shift-down to switch the gear speed smoothly without interrupting the driving force.

Further, even in the second gear speed, the power control device ECU performs the regenerative deceleration operation, when the vehicle is in the deceleration state and the charging rate SOC of the secondary battery BATT is less than the predetermined value. In the case of performing the regenerative deceleration operation in the second gear speed, the operation is different when the first intermeshing mechanism SM1 is in the 3rd-speed side coupled state or in the neutral state.

In the case where the first intermeshing mechanism SM1 is in the 3rd-speed side coupled state, the 3rd-speed drive gear G3a is rotated by the first driven gear Go1 which is rotated by the 2nd-speed drive gear G2a, and the 3rd-speed drive gear G3a rotates the rotor MGb of the electric motor MG via the first drive gear shaft 4. Therefore, the regeneration is performed to generate the electric power by braking the rotor MGb to inhibit the revolution thereof.

In the case where the first intermeshing mechanism SM1 is in the neutral state, the lock mechanism B1 is set to the fixed state so as to set the revolution speed of the ring gear Ra to "0". Further, the carrier Ca rotating together with the 3rd-speed drive gear G3a which intermeshes with the first driven gear Go1 is braked by making the electric motor MG which is coupled to the sun gear Sa to generate the electric power, so that the regeneration is performed.

To achieve the HEV traveling at the second gear speed, for example, the driving force of the electric motor MG is transmitted to the output member 3 via the 3rd-speed gear train G3 under the condition that each rotating element in the planetary gear mechanism PG is in a lock state of being unable to make relative rotation, which is achieved by setting the first intermeshing mechanism SM1 to the 3rd-speed side coupled state in which the 3rd-speed drive gear G3a and the first drive gear shaft 4 are coupled. Or, by setting the first intermeshing mechanism SM1 to the neutral state, setting the lock mechanism B1 (brake) to a reverse disabled state so that the revolution speed of the ring gear Ra is equal to "0", and transmitting the driving force of the electric motor MG to the first driven gear Go1 via the first gear speed path, the HEV traveling at the second gear speed is achieved.

In a case of establishing the third gear speed by using the driving force of the internal combustion engine ENG, the first intermeshing mechanism SM1 is set to the 3rd-speed side coupled state in which the 3rd-speed drive gear G3a and the first drive gear shaft 4 are coupled, the second clutch C2 is set to the released state, and the first clutch C1 is engaged to enable the transmission state. By doing so, the driving force of the internal combustion engine ENG is transmitted to the output member 3 via the input shaft 2, the first clutch C1, the first drive gear shaft 4, the first intermeshing mechanism SM1, and the 3rd-speed gear train G3, and is output at a revolution speed of 1/i of the engine revolution speed.

In the third gear speed, since the first intermeshing mechanism SM1 is set to the 3rd-speed side coupled state in which the 3rd-speed drive gear G3a and the first drive gear shaft 4 are coupled, the sun gear Sa and the carrier Ca of the planetary gear mechanism PG rotate identically.

Therefore, each rotating element of the planetary gear mechanism PG is in the locked state of being unable to rotate relatively, so that the regenerative deceleration is performed by braking the sun gear Sa at the electric motor MG, and HEV traveling is performed when the driving force of the electric motor MG is transmitted to the sun gear Sa. Moreover, it is possible to perform the EV traveling of traveling by the driving force from the electric motor MG only, by releasing the first clutch C1.

In the third gear speed, when the power control device ECU predicts a shift-down in the gear speed according to the vehicle information such as the vehicular velocity, the manipulated amount of the accelerator pedal and the like, the second intermeshing mechanism SM2 is set to the 2nd-speed side coupled state in which the 2nd-speed drive gear G2a and the second drive gear shaft 5 are coupled or a pre-shift state nearby the 2nd-speed side coupled state. When the power control device ECU predicts a shift-up in the gear speed, the second intermeshing mechanism SM2 is set to the 4th-speed side coupled state in which the 4th-speed drive gear G4a and the second drive gear shaft 5 are coupled or a pre-shift state nearby the 4th-speed side coupled state.

By doing so, only by engaging the second clutch C2 to the transmission state and releasing the first clutch C1 to the released state, it is possible to perform the gear shifting so as to shift gears smoothly without interrupting the driving force.

In a case of establishing the fourth gear speed using the driving force of the internal combustion engine ENG, the second intermeshing mechanism SM2 is set to the 4th-speed side coupled state in which the 4th-speed drive gear G4a and the second drive gear shaft 5 are coupled, the first clutch C1 is set to the released state, and the second clutch C2 is engaged to enable the transmission state.

During traveling at the fourth gear speed, when the power control device ECU predicts a shift-down in the gear speed according to the vehicle information, the first intermeshing mechanism SM1 is set to the 3rd-speed side coupled state in which the 3rd-speed drive gear G3a and the first drive gear shaft 4 are coupled or to a pre-shift state nearby the 3rd-speed side coupled state.

On the other hand, when the power control device ECU predicts a shift-up in the gear speed according to the vehicle information, the first intermeshing mechanism SM1 is set to the 5th-speed side coupled state in which the 5th-speed drive gear G5a and the first drive gear shaft 4 are coupled or to a pre-shift state nearby the 5th-speed side coupled state. By doing so, only by engaging the first clutch C1 to the transmission state and releasing the second clutch C2 to the released state, it is possible to perform the shift-up or the shift-down in the gear speed so as to shift gears smoothly without interrupting the driving force.

In case the regenerative deceleration or the HEV traveling is performed during traveling at the fourth gear speed, when the power control device ECU predicts a shift-down, the first intermeshing mechanism SM1 is set to the 3rd-speed side coupled state in which the 3rd-speed drive gear G3a and the first drive gear shaft 4 are coupled, the regenerative deceleration is achieved if the electric motor MG is braked and the HEV traveling is achieved if the driving force of the electric motor MG is transmitted.

When the power control device ECU predicts a shift-up, the first intermeshing mechanism SM1 is set to the 5th-speed side coupled state in which the 5th-speed drive gear G5a and the first drive gear shaft 4 are coupled, the regenerative deceleration is achieved if the electric motor MG is braked and the HEV traveling is achieved if the driving force of the electric motor MG is transmitted.

In a case of establishing the fifth gear speed by using the driving force of the internal combustion engine ENG, the first intermeshing mechanism SM1 is set to the 5th-speed side coupled state in which the 5th-speed drive gear G5a and the first drive gear shaft 4 are coupled, the second clutch C2 is set to the released state, and the first clutch C1 is engaged to enable the transmission state. In the fifth gear speed, since the internal combustion engine ENG and the electric motor MG are in a directly-coupled state since the first clutch C1 is set to the transmission state, HEV traveling is achieved when the driving force is output from the electric motor MG, and the regenerative deceleration is achieved when the electric motor MG is braked to generate electricity.

To achieve the EV traveling at the fifth gear speed, the first clutch C1 should be set to the released state in addition to the second clutch C2. Moreover, during EV traveling at the fifth gear speed, it is possible to start the internal combustion engine ENG by gradually engaging the first clutch C1.

When the power control device ECU predicts a shift-down to the fourth gear speed according to the vehicle information during traveling at the fifth gear speed, the second intermeshing mechanism SM2 is set to the 4th-speed side coupled state in which the 4th-speed drive gear G4a and the second drive gear shaft 5 are coupled or a pre-shift state nearby the 4th-speed side coupled state. By doing so, it is possible to perform shift-down to the fourth gear speed smoothly without interrupting the driving force.

In a case of establishing the reverse gear speed by using the driving force of the internal combustion engine ENG, the lock mechanism B1 is set to the fixed state, the third intermeshing mechanism SM3 is set to the coupled state in which the reverse drive gear GRa and the reverse shaft 6 are coupled, and the second clutch C2 is engaged to enable the transmission state. By doing so, the revolution speed of the input shaft 2 is shifted to a negative revolution (revolution in the reverse direction) with a revolution speed of [the number of teeth of the idle drive gear Gia/the number of teeth of the third idle driven gear Gid]×[the number of teeth of the reverse drive gear GRa/the number of teeth of the reverse driven gear GRb]×[1/i(g+1)] and output from the output member 3, to establish the reverse gear speed.

In the reverse gear speed, the regenerative deceleration is achieved if the rotor MGb rotating in the reverse direction is made to generate the driving force in the normal rotation direction so as to brake the same, and the HEV traveling is achieved if the rotor MGb rotating in the reverse direction is made to generate the driving force in the reverse direction. Further, the reverse gear speed by the EV traveling may be established by setting both clutches C1 and C2 to the released state, setting the lock mechanism B1 (the brake) to the fixed state, and reversing the electric motor MG.

According to the bearing locking mechanism of the present embodiment, it becomes possible to prevent the bearing G3c for the 3rd-speed gear from dropping from the transmission case 7, since the fixing member B1a is locked to the side surface in the axial direction of the bearing G3c for the 3rd-speed gear. By doing so, there is no need for a circlip as was in the conventional technique, and there is no need to form a notch portion for fixing the circlip to the transmission case. Therefore, it becomes possible to surely prevent the bearing G3c for the 3rd-speed gear from dropping from the transmission case 7, without decreasing the durability of the transmission case 7 and while preventing the increase in size of the automatic transmission 1.

Further, since the fixing member B1a is a component part of the lock mechanism B1 (the brake), there is no need for using the circlip exclusive for the bearing locking mechanism as was in the conventional technique, and it becomes possible to reduce the number of parts and reduce the man-hours for assembling the automatic transmission 1.

Further, the overhanging portion B1b overhanging outwardly in the radius direction is provided to the fixing member B1a, and the overhanging portion B1b is configured to receive the force in the axial direction which is transmitted from the bearing 3b for the output shaft of the output shaft 3a (other rotating body) to the transmission case 7. By doing so, it becomes possible to improve the strength of the fixing member B1a and the transmission case 7 using the space outwardly in the radius direction of the fixing member B1a.

Further, a lubricating oil hole is provided to the hub G3b as the rotating body. The lubricating oil is supplied from the lubricating oil hole to the outer circumferential surface of the hub G3b (the rotating body). To the bearing G3c for the 3rd-speed gear side of the inner circumferential surface which forms a piercing hole into which the hub G3b of the fixing member B1a is inserted, a guide portion B1c which is notched in a curved manner so as to guide the lubricating oil supplied to the outer circumferential surface of the hub G3b (the rotating body) to the bearing G3c for the 3rd-speed gear, is provided. By doing so, it becomes possible to appropriately supply the lubricating oil supplied to the outer circumferential surface of the hub G3b (the rotating body) from the lubricating oil hole of the hub G3b to the bearing G3c for the 3rd-speed gear.

In the present embodiment, explanation is given while using the dual clutch transmission as the transmission. However, the transmission of the present invention is not limited thereto.

Further, in the present embodiment, explanation is given on the transmission 1 equipped with the electric motor MG. However, the electric motor MG may be omitted.

What is claimed is:

1. A transmission comprising:
   a transmission case;
   a bearing designed to support a rotating body pivotally on the transmission case; and
   a planetary gear mechanism;
   a brake configured to releasably lock one of a plurality of elements of the planetary gear mechanism, wherein
   the brake is positioned adjacent to the bearing,
   the brake comprises a fixing member fixed to the transmission case, and
   the fixing member is engaged with a side surface of the bearing in an axial direction of the bearing,
   wherein the rotating body is formed with a lubricating oil hole, and a lubricating oil is supplied to an outer peripheral surface of the rotating body from the lubricating oil hole, and
   the fixing member is formed with a guide portion,
   the guide portion is a curved notch formed at a bearing side of an inner circumferential surface which forms a piercing hole into which the rotating body of the fixing member is inserted, and
   the curved notch is configured to guide the lubrication oil supplied to the outer peripheral surface of the rotating body to the bearing.

2. The transmission according to claim 1, wherein
   the fixing member is equipped with an overhanging portion which overhangs outwardly in a radial direction,
   the overhanging portion receives force in the axial direction which is transmitted from other bearing of other rotating body to the transmission case, and
   the overhanging portion extends to a side surface of an outer ring of the bearing which is supported by a shaft.

* * * * *